Oct. 14, 1930.  C. C. CADDEN  1,778,244
METHOD OF MAKING HOSE COUPLINGS
Filed May 22, 1926
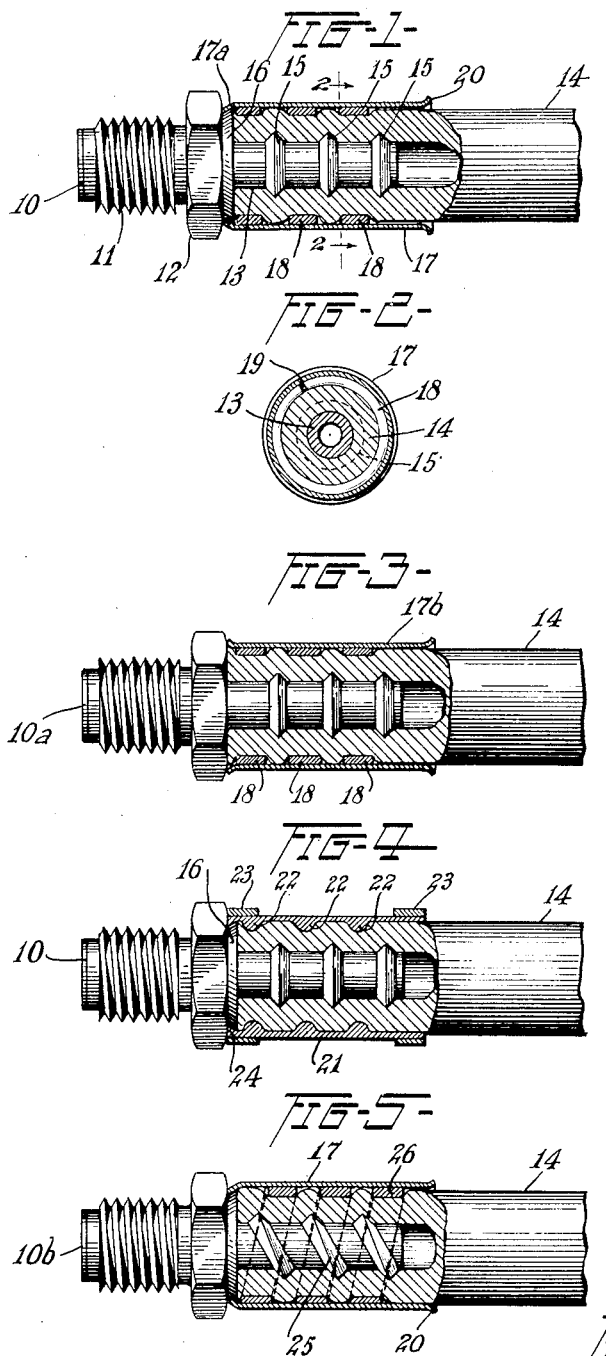
Inventor
Charles C. Cadden
By Pierson, Eakin & Avery
Attys.

Patented Oct. 14, 1930

1,778,244

UNITED STATES PATENT OFFICE

CHARLES C. CADDEN, OF AKRON, OHIO, ASSIGNOR TO THE B. F. GOODRICH COMPANY, OF NEW YORK, N. Y., A CORPORATION OF NEW YORK

METHOD OF MAKING HOSE COUPLINGS

Application filed May 22, 1926. Serial No. 110,988.

This invention relates to couplings for hose and to methods of mounting the same and its chief objects are to provide a secure and lasting coupling and to provide such a coupling with convenience and economy. More specific objects are to provide an improved coupling presenting a smooth exterior and having a metal enclosure for all deformed or indented parts of the hose, to protect the strained portions of the hose from wear.

Of the accompanying drawings:

Fig. 1 is an elevation of the end portion of a piece of hose with a coupling thereon embodying and assembled in accordance with my invention, part of the same being sectioned and broken away.

Fig. 2 is a section of the same on line 2—2 of Fig. 1.

Fig. 3 is a view, similar to that of Fig.1, of a modification.

Fig. 4 is a similar view of another modification.

Fig. 5 is a similar view of still another modification.

Referring to the drawings, the preferred embodiment shown in Fig. 1 comprises a plug member 10 formed with a screw-coupling end portion 11, which of course may be either male or female, a wrench-receiving portion 12, and a stem portion 13 adapted to be mounted in the bore of the hose 14, the said stem portion being formed with a series of circumferential flanges 15, 15 for indenting the inner wall of the hose to assure a seal and to retain the plug member therein. At the base of the stem portion the plug member is formed with a flange 16 of which the peripheral surface extends to and is tapered toward the wrench-receiving portion 12, so as to retain in position a ferrule 17, preferably seamless and inextensible, which is mounted upon the hose and has its adjacent end margin 17ª crimped upon the flange. Mounted upon the hose under the ferrule are hose-constricting rings or bands 18, 18, each formed with a transverse split 19 (Fig. 2), to permit their expansion for slipping them onto the end of the hose. The bands 18 are positioned in alternation to the flanges 15 of the plug member, so as to distort the wall of the hose into sinuous form in longitudinal section, as shown, so that the hose is securely retained in association with the coupling. The rear end margin 20 of the ferrule 17 is preferably flared, as shown, to facilitate the mounting of the ferrule on the hose and to avoid abrupt flexure of the hose wall at the end of the ferrule in service.

In the preferred method of assembling the parts the ferrule 17 is first slipped onto the hose and slid back some distance from its end and then the bands 18, in suitably expanded condition are slipped onto the hose and slid back beyond the coupling region. The stem portion 13 of the plug member is then inserted in the end of the hose, after which the bands 18 are moved forward to their final positions and crimped upon the hose, the ferrule is moved forward over the bands to grip the same and to prevent their subsequent expansion, and the forward end margin 17ª of the ferrule is crimped onto the flange 16 of the plug member to retain the ferrule in place and all of the parts in snug, assembled relation. To facilitate the moving forward of the ferrule to final position over the bands the ferrule initially may be formed at its forward end with a flared margin such as its rear margin shown at 20, such form providing for an inward wedging or constricting action of the ferrule upon the bands in its forward movement.

The resulting structure is one in which all parts are positively interlocked, and yet the assembly of the parts is a simple and rapid operation. The coupling also presents a desirably smooth exterior.

In the modification, shown in Fig. 3 the flange 16 of Fig. 1 is omitted from the plug member, 10ª, and friction is relied upon to retain the ferrule, 17ᵇ, in place.

In Fig. 4 a relatively long, expansible and contractable band or sleeve 21, formed with internal, circumferential ribs 22, 22, is substituted for the bands 18 of Fig. 1, short endless bands 23, 23 are substituted for the ferrule 17, and the sleeve 21 is formed at its front end with an internal flange 24 adapted to be closed upon and to interlock with the flange 16 of the plug member 10.

In Fig. 5 the plug member, 10$^b$, is formed with a helical rib, 25, instead of the circumferential flanges 15 of Fig. 1, and a helical band 26 is correspondingly substituted for the bands 18 of Fig. 1, the plug member of this form being adapted to be screwed into position in the hose.

Other modifications may be resorted to within the scope of my invention, and I do not wholly limit my claim to the specific construction or procedure described.

I claim:

The method of making a hose coupling which comprises mounting a plug member in the end of the hose, mounting hose-constricting means on the hose over the hose-enclosed portion of the plug member, securing the hose-constricting means in constricting condition by sliding and wedging a separate endless member thereonto by simple axial thrust, and thereafter joining the internal and external hose-engaging members of the assembly against relative longitudinal displacement by bending one of the members into interlocked relation to the other.

In witness whereof I have hereunto set my hand this 19th day of May, 1926.

CHARLES C. CADDEN.